United States Patent
Roebuck

(10) Patent No.: US 11,216,901 B2
(45) Date of Patent: Jan. 4, 2022

(54) CONTEXTUAL AUTHENTICATION SYSTEM

(71) Applicant: HRB Innovations, Inc., Las Vegas, NV (US)

(72) Inventor: Eric Roebuck, Shawnee, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 498 days.

(21) Appl. No.: 14/576,658

(22) Filed: Dec. 19, 2014

(65) Prior Publication Data

US 2016/0180484 A1 Jun. 23, 2016

(51) Int. Cl.
*G06Q 40/00* (2012.01)
*G06Q 50/26* (2012.01)
*H04L 29/06* (2006.01)

(52) U.S. Cl.
CPC ......... *G06Q 50/265* (2013.01); *G06Q 40/123* (2013.12); *H04L 63/08* (2013.01); *H04L 2463/102* (2013.01)

(58) Field of Classification Search
CPC ......... G06Q 40/02; G06Q 40/04; G06Q 20/40
USPC ...................................... 705/31–40
See application file for complete search history.

(56) References Cited

U.S. PATENT DOCUMENTS

| | | | | |
|---|---|---|---|---|
| 2004/0064317 A1* | 4/2004 | Othmer | ........... | G10L 15/30 704/260 |
| 2005/0038722 A1* | 2/2005 | Throndson | ........ | G06Q 50/26 705/31 |
| 2007/0136157 A1* | 6/2007 | Neher, III | ........... | G06Q 40/02 705/31 |
| 2010/0332362 A1* | 12/2010 | Ramsey | ......... | G06Q 40/00 705/31 |
| 2012/0109792 A1* | 5/2012 | Eftekhari | .......... | G06Q 40/02 705/31 |
| 2012/0209760 A1* | 8/2012 | McCarthy | ......... | G06Q 40/025 705/38 |
| 2012/0265755 A1* | 10/2012 | McNally | .......... | G06Q 10/063 707/723 |
| 2014/0363058 A1* | 12/2014 | Emmett | ............ | G06F 21/32 382/117 |

OTHER PUBLICATIONS

E-Tax Invoice System Using Web Services Technology: A Case Study of the Revenue Department of Thailand This research project proposed an "e-Tax Invoice System" using Web Services (WS) technology for the Revenue Department of Thailand (RD). (Year: 2008).*

* cited by examiner

*Primary Examiner* — Bruce I Ebersman
*Assistant Examiner* — John A Anderson
(74) *Attorney, Agent, or Firm* — Erise IP, P.A.

(57) ABSTRACT

A system, a method, and computer-readable media for opportunistically authenticating a taxpayer. Specifically, embodiments of the invention leverage the fact that the user has possession of particular documents or access to certain information as evidence that the user is the person referred to in those documents or information. If the user provides sufficient evidence to authenticate themselves while providing the information required for the financial transaction, no separate authentication step may be required. At a high level, documents or other data imported in a first context (e.g., during the process of preparing a tax return for a user) are used as evidence of the user's authenticity in a second context.

18 Claims, 3 Drawing Sheets

CONTEXTUAL AUTHENTICATION SYSTEM

BACKGROUND

1. Field

Embodiments of the invention generally relate to the authentication of users, and in particular, to a streamlined authentication process that leverages information provided by the user in another context to opportunistically authenticate them.

2. Related Art

Traditionally, a user seeking to execute a financial transaction must authenticate themselves before the other parties to the transaction will go forward. For example, a merchant may require that a customer paying by check show a driver's license before accepting the check. Larger financial transactions may require correspondingly higher-confidence authentication to affirm that the user really is who they claim to be. For example, additional forms of identification, proof of residence, or out-of-wallet questions may be required. However, each of these forms of authentication may be problematic in the context of online authentications, and may be unreliable, since a legitimate user may not have a particular document or know a particular fact. Furthermore, high-confidence authentication can be difficult to complete and cumbersome, resulting in a degraded user experience. Accordingly, there is a need for a streamlined authentication process that can provide high-confidence authentication with a minimum of added user interaction.

SUMMARY

Embodiments of the invention address the above need by reusing information that is provided by the user outside of the authentication context to opportunistically build confidence that the user is who they claim to be. Specifically, embodiments of the invention leverage the fact that the user has possession of particular documents or access to certain information as evidence that the user is the person referred to in those documents or information. If the user provides sufficient evidence to authenticate themselves while providing the information required for the financial transaction, a separate authentication step may not be required.

In a first embodiment, the invention is a system for opportunistically authenticating a taxpayer, comprising a user interface engine operable to receive information identifying a taxpayer and a plurality of authentication credentials and provide the information and the credentials to a tax form import engine; the tax form import engine, operable to transmit each credential of the plurality of the authentication credentials to a respective tax form provider and, if the provider verifies that the credential is valid, receive tax forms therefrom; and an authentication engine operable to establish a baseline authentication metric, adjust the authentication metric based on whether each credential of the plurality of credentials is valid, and, based on a final value for the authentication metric, authenticate the user without requiring further interaction.

In a second embodiment, the invention is a method for opportunistically authenticating a taxpayer, comprising the steps of receiving, from a user, information identifying a taxpayer; receiving, from the user, a plurality of authentication credentials useable to import a plurality of tax forms from a respective plurality of tax form providers; establishing a baseline authentication metric; for each credential of the plurality of authentication credentials, submitting the credential to a respective tax form provider of the plurality of tax form providers; if the tax form provider verifies the validity of the credential, importing a corresponding tax form and increasing the value of the authentication metric; and after importing each of the plurality of tax forms, determining whether a final value of the authentication metric is sufficient to authenticate the user without requiring further user interaction.

In a third embodiment, the invention is one or more computer-readable media storing computer-executable instructions that, when executed by a processor, perform a method of opportunistically authenticating a user, comprising the steps of receiving information identifying a taxpayer; receiving a first credential useable to import a non-wage income statement; receiving a second credential useable to import a wage statement; transmitting the first credential to a first financial institution; receiving, from the first financial institution, a first non-wage income statement; transmitting the second credential to a payroll provider; receiving, from the payroll provider, a wage statement; and determining, based at least in part on receiving the wage statement and the first non-wage income statement in response to the first and second credentials, whether an additional authentication step is necessary to authenticate the user as the tax payer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
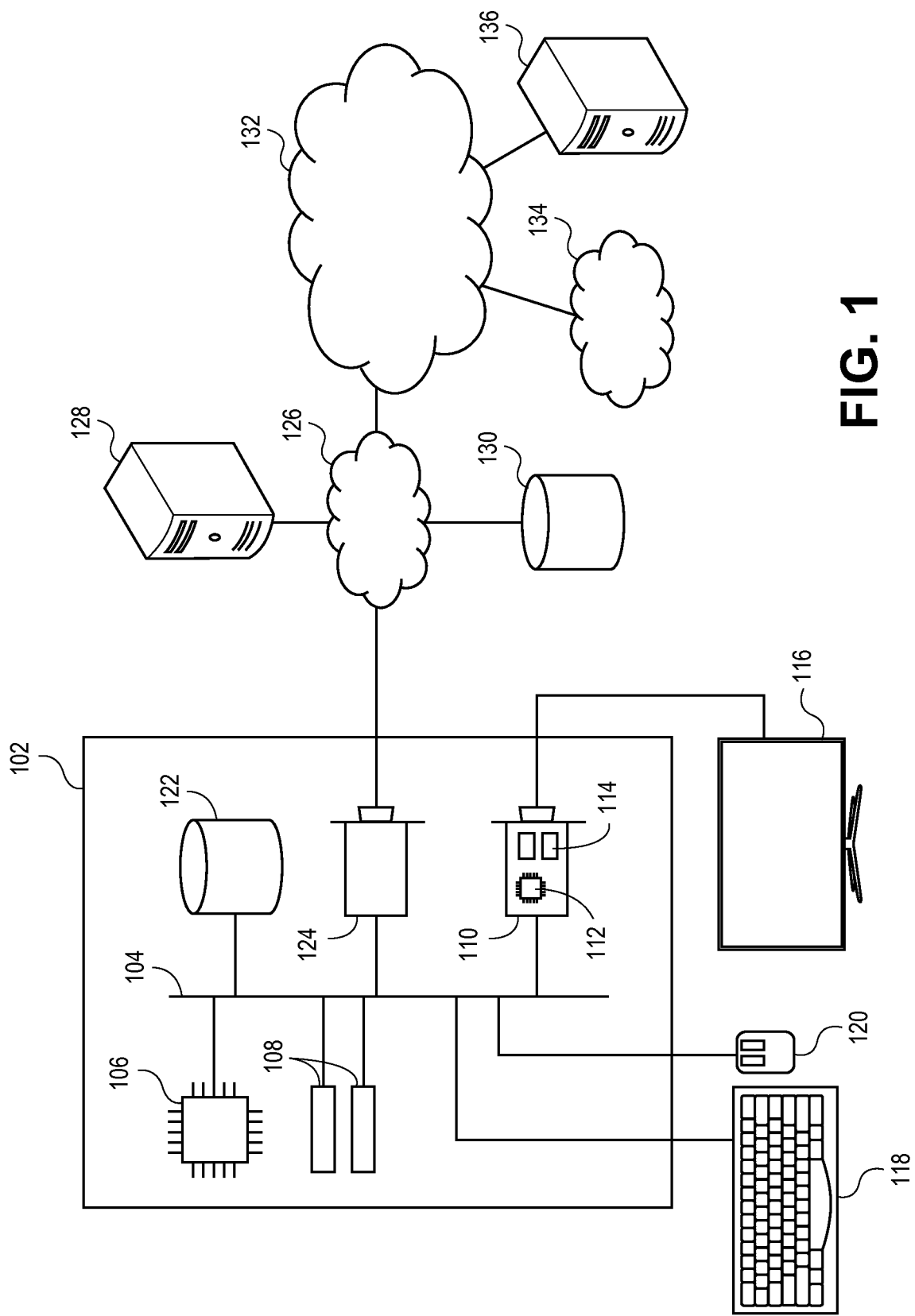
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

At a high level, embodiments of the invention use documents or other data that must be imported in a first context (e.g., during the process of preparing a tax return for a user) as evidence in a second context (i.e., that the user is who they claim to be). The term "document," as used in the below discussion is intended to encompass other dynamic data (such as, for example, a list of bank transactions) as well. For the sake of concreteness, the discussion below discusses embodiments of the invention in the context of preparing a tax return; however, other contexts where other embodiments of the invention will be apparent to one skilled in the art upon reading this disclosure. For example, documents supplied during the process of applying for a mortgage loan or a credit card could be used to verify the applicant's identity. Similarly, information supplied by a person applying for government benefits can be used to ensure that they are who they claim to be. In another embodiment, the identity of a user enrolling in a financial management service can be confirmed to a high degree during the enrollment process, and this authentication can be leveraged to offer services (such as access to credit reports) that might otherwise be unavailable due to a high potential for fraud. All such applications are considered within the scope of the invention.

As a non-limiting example, possession of a wage statement such as a W-2 for a taxpayer contributes a certain amount to an authentication metric that indicates that the user is the taxpayer (or is authorized by the taxpayer to file on their behalf), and can be verified by successfully importing the wage statement from a payroll provider using information printed on the physical wage statement. Similarly, access to one or more non-wage income statements (such as 1099 forms) also contributes to the authentication metric and can be verified by using user-provided credentials to import the non-wage income statements from the corresponding financial institutions' secure sites. Other sources may also contribute to the authentication metric during the course of preparing the tax return. When the time comes to authenticate the user, the total authentication metric is examined and, if it is high enough, the user can be considered to have already been opportunistically authenticated and a separate authentication step can be skipped.

When embodied as a system, the invention broadly comprises a user interface engine, a tax form import engine, and an authentication engine. These components may reside on a single computer or on different computers communicating over a network as depicted in FIG. 1. These components may also communicate over the networks depicted in FIG. 1 with other related entities, such as payroll providers, financial institutions, financial management service providers, and government tax authorities.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
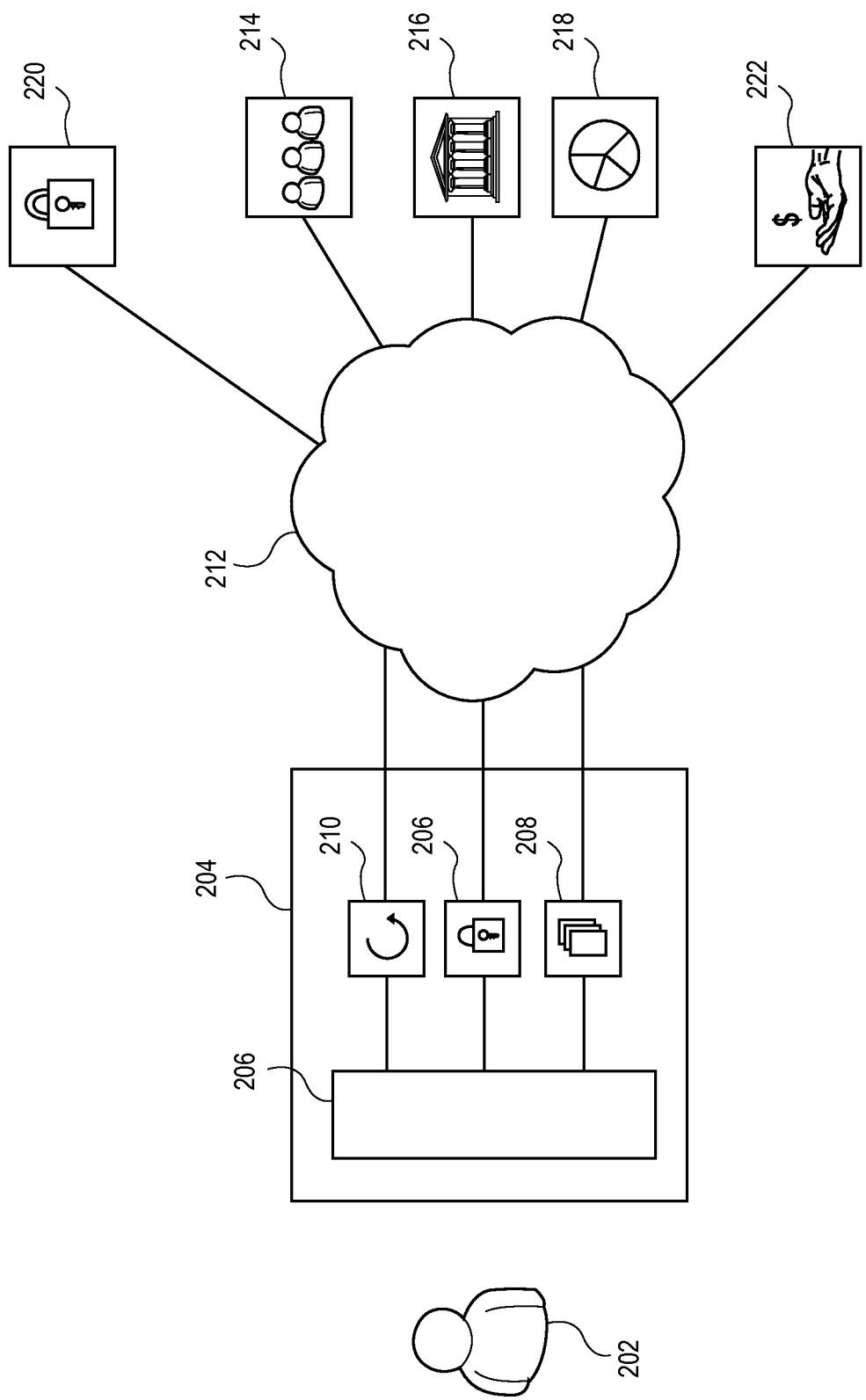
FIG. 2 depicts a block diagram showing the components of a system embodying the invention.

Turning now to FIG. 2, a block diagram showing the components of a system embodying the invention is depicted. User 202 provides information to tax preparation system 204 in the process of preparing a tax return for filing with one or more government taxing authorities. User interface engine 206 provides a front end into system 204 for user 202 to enter the tax-related information needed to prepare the return. Information input by the user includes information identifying the taxpayer for the return. It should be appreciated that the tax information discussed herein relates to a particular taxpayer, although a user of the invention may be the taxpayer or an authorized third party operating on behalf of the taxpayer, such as a professional tax preparer ("tax professional") or an authorized agent of the taxpayer. Therefore, use of the term "taxpayer" herein is intended to encompass either or both of the taxpayer and any third party operating on behalf of the taxpayer. Additionally, a taxpayer may comprise an individual filing singly, a couple filing jointly, a business, or a self-employed filer. It is a goal of system 204 generally, and of authentication engine 206 in particular, to ensure that user 202 is actually the taxpayer whose identifying information they have provided, in order to avoid fraudulent returns, and it is an advantage of the invention that system 204 may be able to do so without requiring that user 202 complete a separate and burdensome authentication process.

Some information may be manually input by user 202 into user interface engine 206, some information may be pre-populated based on previous returns prepared by system 204, and some information may be able to be imported directly from the provider using a credential entered by user 202. User interface engine 206 can prompt user 202 to enter such credentials in order to simplify the task of manually entering the data on the tax form. User interface engine 206 can also simplify the process of completing the tax return itself, by converting tax forms into a more user-friendly questionnaire, suggesting deductions and credits, etc. Such a front end is presently offered in multiple forms by H&R Block®. For example, front end 206 may be a web site that user 202 can log into using a web browser, or it may take the form of dedicated software running on the user's computer (such as, e.g., computer 102) or the computer of a tax professional preparing the tax return for user 202. User interface engine 206 is communicatively coupled with the other components of system 204, including authentication engine 206, filing engine 208 and form import engine 210. The precise form of this coupling will, of course, depend on the structure of system 204; in embodiments where system 204 is embodied on a single computer, communication may take place over a function call API or an inter-process communication mechanism. In embodiments where system 204 is distributed among multiple computers, this communication may take place via a network protocol over a local-area network (LAN) or Internet, as described above in the context of FIG. 1.

Tax form import engine 210 generally receives credentials from user 202 and uses them to retrieve tax-related information (which may be tax forms or other documents relevant to the return being prepared, including information related to tax deductions and credits) from providers that can be imported into the application being prepared. Accordingly, tax form import engine 210 is communicatively coupled via network 212 to payroll provider 214, financial institution 216, and financial management services provider 218. In some embodiments, multiple payroll providers such as payroll provider 214, multiple financial institutions such as financial institution 216, and/or multiple financial management services providers such as financial management services provider 218 may be additionally coupled to tax form import engine 210. In other embodiments, one or more of these tax form providers may be absent. Any other individual or institution that provides information used in completing a tax return for user 202 may also be connected to tax form import engine 210. While some tax form providers could provide user's 202 tax forms based only on information identifying the taxpayer (for example, a taxpayer identification number), many such providers require evidence that it is the appropriate taxpayer who is requesting them, and accordingly require credentials.

Credentials provided by the user can take a variety of forms. For example, where a copy of the tax-related information has been mailed to the taxpayer, a unique code may be included to allow access to import the data electronically. Thus, only the taxpayer (or someone with access to their mailbox) can import the electronic data. Alternatively, where the taxpayer has an existing electronic account with the tax-related information provider, the access credentials for this existing account (e.g., a username and password) can be reused to allow access to import the form data electronically. Yet another alternative is that a government tax authority can (after authenticating them) issue the taxpayer a password or PIN useable to electronically file taxes and/or import prior year tax data or current year tax forms (such as, for example, a 1099-G). For each such credential, tax form import engine 210 can contact the corresponding tax-related information provider, provide the credential supplied by user 202 and import the tax-related data, thereby saving user 202 the effort of entering the information manually. Other credentials (such as, e.g., an electronic filing PIN) may be instead used for purposes other than importing tax-related data (here, for electronically filing the return). The credentials thus demonstrate to the tax-related information provider that system 204 is acting on behalf of user 202.

It is generally the task of authentication engine 206 to authenticate user 202 as the taxpayer for whom the tax return is being prepared. Historically, this has been done by a combination of information supplied by the user that can be linked to the taxpayer (e.g., name, social security number, and address) and so-called out-of-wallet questions. These out-of-wallet questions can be provided by a credit bureau, security provider, or credit reporting agency, or can automatically be generated by database convergence, and have the property that their answers should be known by the taxpayer, but cannot easily be learned by an identity thief who has stolen the taxpayer's identity. As depicted in FIG. 2, authentication engine 206 is communicatively coupled via network 212 to authentication service provider 220, which can provide out-of-wallet questions, credit reports, or other information used to authenticate user 202. One example of an out-of-wallet question might be "What state did you live in at the end of 2003?" However, relying primarily on such questions can lead to high failure rates, even among legitimate users. This can result from incorrect information in the databases used to generate the out-of-wallet questions, or simply forgetfulness on the part of the user. Furthermore, a separate authentication step is undesirable to many users, especially if a legitimate user is unable to authenticate successfully. Where possible, a separate authentication step should be avoided, as it is time consuming, and it can result in user drop-off from accessing the service when the user fails to remember the answers to the out-of-wallet questions.

It is an advantage of embodiments of the invention, however, that the credentials supplied by user 202 to be validated by a tax form provider also provide evidence that user 202 is the taxpayer referred to on the tax forms, as discussed in greater detail below. Accordingly, authentication engine 206 begins the authentication process by establishing a baseline authentication metric. This baseline authentication metric can be higher based on, for example, an existing account that user 202 has used in the past to prepare prior returns. Alternatively, if a different account has previously been established for the taxpayer, or if fraudulent returns have previously been filed for the taxpayer, the baseline authentication metric may be lower. In some embodiments, the baseline authentication metric is zero absent any other factors.

Authentication engine 206 then monitors (or is informed of) the various credentials provided by user 202 and their validation or rejection by the corresponding tax form provider, as well as whether the information imported by tax form import engine 210 corresponds to the taxpayer identification input by user 202 (or auto-populated based on a previous return for the taxpayer). Accordingly, authentication engine 206 can build up confidence that user 202 is authentic as each set of valid credentials provided by user 202 that can be tied to the taxpayer provides more evidence. This increased confidence can, for example, take the form of an increased authentication metric. In some embodiments, the increase in authentication metric is contingent on the information accessible using the credentials correlating with the information identifying a taxpayer provided by user 202. For example, a tax form such as a wage statement or non-wage income statement may include a name, address, and taxpayer identification number. If the user supplies credentials to access such a tax form, the authentication metric is only increased if these match the information previously entered by user 202 (or prepopulated by system 204) at the beginning of the return preparation process. On the other hand, in some embodiments, invalid credentials provided by user 202 or repeated validation failure may reduce the authentication metric. Similarly, if user 202 provides credentials to successfully access financial information in an online financial management service (such as, for example to import charitable donations or other deductions), this may increase the authentication metric if these accounts can be tied to the taxpayer. For example, such financial management services may include transaction data that matches data from an account previously linked to the taxpayer. Similarly, information from a financial management service (such as interest deposits for bank accounts) can be correlated to corresponding information on tax forms (here, a 1099-INT). In some embodiments, the increase in the metric may be tied to the age of the corresponding account. For example, a bank account that has existed for 20 years is stronger evidence of authenticity than one that has only been established for 20 days. In other embodiments, the increase in the metric may depend on the associated financial institution. For example, an account from a national bank may contribute more to the authentication metric than a loan from a payday loan provider.

Authentication engine 206 may also adjust the authentication metric further throughout the process of preparing the tax return. For example, if user 202 provides a payment account (to pay for tax preparation services, to pay a tax amount owed, or to receive a refund due), the authentication metric can be adjusted. Again, the history of the payment account, and whether it has previously been associated with the taxpayer, can affect the amount of adjustment made. The authentication metric can also be adjusted based on a successful electronic filing of the return with the government tax authority, or reduced accordingly based on a rejected return.

At one or more points during the preparation process, the authentication engine may be called on by other components of system 204 (depicted in FIG. 2 or not shown) to authenticate user 202. For example, tax preparation engine 208 may authenticate user 202 prior to electronically submitting the tax return to a government tax authority. Alternatively, if a refund anticipation loan or other advance payment of a refund due is requested, authentication engine 206 may be called on to authenticate user 202 prior to authorizing payment. At this point, authentication engine can compare the authentication metric, as it has been adjusted at this point in the tax return preparation process, to a threshold for authentication. In some embodiments, this threshold is constant regardless of the purpose for which it is requested. In other embodiments, differing thresholds may be used for different purposes; for example, a higher threshold might be required to file a return than to authorize a payment, or vice versa. In still other embodiments, the size of payment being authorized can impact the threshold required for authentication. If the authentication metric exceeds the threshold being used, then authentication engine 206 affirms that the user has been authenticated as the taxpayer. If the authentication metric does not exceed the threshold, then the user has not been authenticated and an additional authentication step is required. For example, out-of-wallet questions can be employed at this stage. In some embodiments, the number of out-of-wallet questions presented to the user is dependent on the value of the authentication metric; for example, if the authentication metric was close to the threshold, only a single out-of-wallet question might be necessary, but if the authentication metric was at (or even below) the baseline value, a plurality of questions might be required to ultimately authenticate the user. Of course, it may be the case that the user cannot be authenticated, and the operation that triggered the authentication attempt can be prevented from going forward.

Tax preparation engine 208 is generally responsible for preparing the tax return based on information received from user 202 via user interface 206 and tax form import engine 210. In some embodiments, additional sources of information may also be used to reduce the amount of information user 202 must enter. For example, historical tax returns filed by the taxpayer may be used to prefill certain information so that user 202 only need verify it. For example, address information, dependent information, marital information, and other information that is less likely to change from year to year can be extracted from prior returns and presented to the user for confirmation. In some embodiments this information is retrieved from a data store connected to system 204 where it was stored when the taxpayer prepared a previous return using system 204. In other embodiments, this information is retrieved from tax authority 222. In some embodiments, tax engine 208 uses previous tax return information to suggest tax forms from various tax form providers (such as payroll provider 214, financial institution 216, and/or financial management services provider 218) for user 202 to import. In some embodiments, tax preparation engine 208 is communicatively coupled to tax form import engine 210; in other embodiments, these two components are coupled via user interface engine 206.

Tax preparation engine 208 is also communicatively coupled to government tax authority 222 via network 212. In some embodiments, government tax authority 222 provides a public interface on the Internet to which tax preparation engine 208 connects. In other embodiments, network 212 may be a dedicated connection or virtual private network connecting system 204 and government tax authority 222. Though FIG. 2 depicts the connection of tax preparation engine 208 to government tax authority 222 as being via the same network 212 as is used by tax form import engine 210 to connect to payroll provider 214, financial institution 216, and financial management services provider 218, and by authentication engine 206 to connect to authentication service provider 220, these connections may all be over distinct networks, or some connections may be shared while others are distinct. In some embodiments, tax preparation engine 208 can electronically file the tax return with government tax authority 222 once it has been prepared. As discussed above, in some embodiments, tax preparation engine 208 may require that authentication engine 206 authenticate user 202 prior to electronically filing the return. In other embodiments, government tax authority 222 may have its own procedure for authenticating user 202. In such embodiments, a successful authentication of user 202 by government tax authority 222 may cause authentication engine 206 to increase the authentication metric for future authentication of user 202.

Payroll providers such as payroll provider 214 allow employers to outsource payroll functions such as issuing paychecks, managing deductions, tracking paid time off, and tax management. As such, payroll provider 214 provides wage statements to employees such as user 202 including taxable income, withholding information, and other wage-related information. In the United States, such wage statements are provided on W-2 forms. In some cases, a company may be its own payroll provider. Some payroll providers may include information on printed wage statements that allows the wage statement to be imported by tax preparation software rather than manually entered. In some cases, this information takes the form of a serial number that, in combination with other information such as a taxpayer ID or income amount, allows access to an electronic version of the form. Other payroll providers may have existing user accounts (such as, for example, an account to access an employee self-serve portal) that can be used to download electronic wage statements. Still other payroll providers may issue credentials such as a username and password specifically for the purpose of downloading (or importing) tax forms. Once user 202 supplies credentials, tax form import engine 210 can connect to payroll provider 214, supply the credentials, and (if they are valid) download the income statement in a form in which it can be imported into the tax return being prepared. In some embodiments, payroll providers may also provide additional tax forms (such as, e.g., proof of coverage forms such as 1095-C) that can be imported using the same or different credentials.

A wide variety of financial institutions may provide tax forms relevant to user's 202 tax return as well. For example, brokerages may provide non-wage income statements related to securities trading (i.e., 1099-B or 1099-DIV forms in the United States), banks may provide non-wage income statements related to interest on accounts (i.e., 1099-INT forms in the United States), and pension and retirement plans may provide non-wage income statements related to retirement income (i.e., 1099-R forms in the United States). Of course, many such types of tax forms are possible and may be used by tax preparation engine 208 for preparing a particular return, and some or all of these may be importable by tax form import engine 206. Some or all forms imported by tax form import engine 210 may contribute to the authentication metric calculated by authentication engine 206. In some embodiments, each form successfully imported contributes to the authentication metric. In other embodiments, multiple forms imported from the same financial institution (for example, if a brokerage provides both a 1099-B and a 1099-DIV) only count once toward affecting the authentication metric. In some embodiments, there is a cap on the maximum increase in authentication metric across all non-wage income statement forms. As with wage statements, credentials to download non-income wage statements may be provided on mailed copies of the forms, or existing account credentials may be re-used to download forms. In some cases, the financial institutions themselves may provide the electronic versions of the forms, while in other cases, they may be outsourced to a commercial provider. Such outsourced providers of forms for a financial institution are included in the term "financial institution" for the purposes of this discussion. In some cases, financial institutions may instead offer access to transaction data (such as, for example, a year-end summary of all stock trades or monthly bank statements including interest payments) that can be downloaded, processed and used to generate the corresponding tax form (here, a 1099-B or 1099-INT) instead of (or prior to) receiving the form from the financial institution. Other portions of the tax return being prepared can also be populated based on imported transaction data. For example, payments to registered charitable organizations from a bank account can be used to prepopulate a deduction list such as a Schedule A.

Unlike payroll provider 214 and financial institution 218, financial management service provider 218 is not a source of tax forms, but rather is used by user 202 throughout the year to track income, spending, and other financial matters. This information can be used to document information such as charitable giving, medical expenses, and other tax-related information for user 202 throughout the tax year. Then, during the process of preparing the tax return, user 202 can provide credentials to access the information from financial management service provider 218 such that it can be included in the tax return. If financial management service provider 218 provides enough information to link user 202 to the taxpayer, then this can act as further evidence authenticating user 202, and the authentication metric can be adjusted appropriately by authentication engine 206. For example, if the user has previously supplied a bank account for payment, and the user has granted financial management service 218 access to that bank account, the common account can serve to link the user to the taxpayer. Similarly, if the user has provided financial management service 218 with a taxpayer identification number (for example, to run a credit report) that taxpayer identification number can link the user to the taxpayer.

When embodied as a method for opportunistically authenticating a taxpayer, embodiments of the invention broadly comprise the steps of receiving information from a user, establishing and adjusting an authentication metric based on how well that information identifies the user as the taxpayer, and determining whether the final value of the authentication metric is sufficient to authenticate the user. In particular, the method includes receiving information identifying a taxpayer and a plurality of authentication credentials useable to import a plurality of tax forms from a respective plurality of tax form providers from the user. The method further includes establishing a baseline metric. Next, the method includes submitting each authentication credential to a corresponding tax form provider and, if the tax form provider verifies the credential, importing a corresponding tax form and increasing the value of the authentication metric. Then, after importing the tax forms, the method includes a step of determining whether the final value of the authentication metric is sufficient to authenticate the user without requiring further user interaction.

Figure 3:
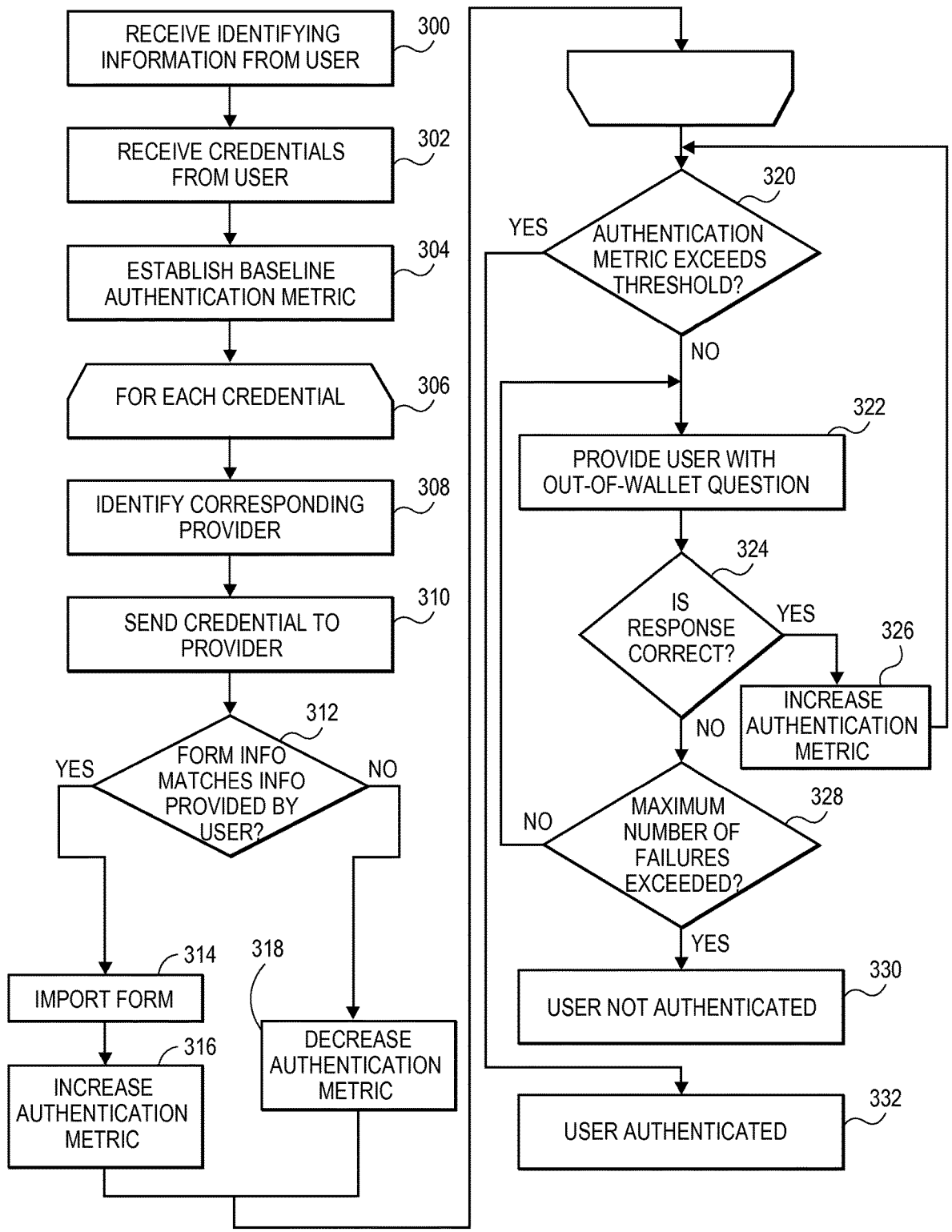
FIG. 3 depicts a flowchart illustrating the operation of a method embodying the invention.

Turning now to FIG. 3, a flowchart illustrating the operation of a method embodying the invention is depicted. The method begins at a step 300, when the system receives information, from the user or prepopulated from a previous return, identifying a taxpayer. In some embodiments, this information can be a name, address, and/or taxpayer identification number. In other embodiments, it can be a username and password for system 204 associated with the taxpayer. It is an advantage of the system that it may be able to opportunistically authenticate the user as the taxpayer without requiring the user to complete a separate authentication step. Thus, if successful, the authentication process is transparent to the user. The user is not taken through any additional steps, but simply finds that they have been authenticated without needing to complete a separate authentication process. In some embodiments, the user may be given an option at this point of whether to answer out-of-wallet questions to authenticate or have authentication engine 206 opportunistically authenticate them.

Next, at a step 302, the system receives one or more credentials from the user. As described here and elsewhere, these credentials can be any form of information allowing access to one or more pieces of the taxpayer's tax-related information, and which ties the user to the taxpayer for whom the return is being prepared. Examples of credentials used for importing a wage statement include an employee benefit account username and password, a taxpayer identification number (such as a social security number in the United States) and PIN, and a taxpayer identification number and one or more fields from the form to be imported. A wage statement, once imported, has been tied to the user via the process of importing it, and can be definitively tied to the taxpayer by comparing taxpayer information on the form (such as name, address, and taxpayer identification number) to the information provided by the user. Thus the credential used in the context of importing wage data can be opportunistically used in the second context of authenticating the user. Other employment-related tax forms (such as, for example, a form 1095-C certificate of health insurance coverage) can also be imported and used for opportunistic authentication as long as they can be tied to the taxpayer by a similar comparison of taxpayer information. In some cases these forms may be imported from the same provider as the wage statement using the same credentials; in other cases, separate credentials may be required.

Similarly, credentials can be provided by the user at step 302 for importing one or more non-wage income statements, such as 1099 forms. In the case of a financial institution issuing a non-wage income statement, it may be the case that the user has an existing set of authentication credentials with the financial institution. For example, if the financial institution offers online banking, the user may have a username and password associated with an online baking portal. The credentials may be reused by the financial institution for the purpose of allowing the user to import tax forms. Because a user is unlikely to share such online banking credentials with untrusted parties, it is likely that anyone with the credentials is authorized to access the account. Similar to wage statements, non-wage income statements can be linked to the taxpayer by comparing an included name address, phone number, or taxpayer identification number to the information provided by the user. Thus, the user is linked to the account and the account is linked to the taxpayer, providing further opportunistic authentication of the taxpayer.

A third class of credentials is associated with filing the return itself. For example, the government tax authority may separately authenticate the user and provide them with a credential (such as, for example, a PIN) allowing the user to electronically file a tax return without a physical signature. If this credential is successfully used to file a return, the user has been tied to the return and the return is tied to the taxpayer, allowing for additional opportunistic authentication. In some cases, multiple returns may be filed, each requiring a separate set of credentials (e.g., one or more state returns in addition to a federal return), and each of these credentials can provide additional authentication.

Yet another source of credentials is those used for financial management service providers or online banking that does not provide tax forms. Such credentials may be provided during the process of preparing a tax return for the purposes of, for example, identifying deductions related to charitable giving, business expenses, or medical expenses. Because the user's spending may already be categorized in the financial management service, the user can easily import deductible items. However, because these credentials may not be associated with a tax form, the account must be associated with the taxpayer before it can be used for authentication purposes. In some cases, the user is required to supply a taxpayer identification number before opening an account, which can be compared against the taxpayer identification number associated with the return. In other cases, the financial management service account may be linked to other financial accounts (such as, for example, bank accounts, credit card accounts) that are already linked to the taxpayer. Other methods of using the information accessible using the credential to tie the user to the taxpayer are also contemplated, and are within the scope of the invention. If the financial management services account can be linked in whatever manner to the taxpayer, then it can serve as an additional source of opportunistic authentication.

Next, at step 304, a baseline authentication metric is established. In some embodiments, this can be a constant baseline for all users. In other embodiments, the baseline authentication metric can vary for each user depending on a number of factors including user history, the method by which the user is preparing the return (in-person or electronically), and other factors as discussed elsewhere. In some embodiments, the authentication metric is a simple count of the sources of authentication linking user 202 to the identified taxpayer (wage statements, non-wage statements, etc.). In other embodiments, the authentication metric is a score, and each source of authentication contributes a different amount to the score. For example, a strong username and password to a bank account could contribute 100 points to the score, while information from a mailed form could contribute 20 points to the score. In still other embodiments, a hybrid of these is used, such that both an aggregate score and a number of contributing sources are required before a user can considered to be authenticated.

Processing then proceeds to loop 306, which iterates over each set of credentials provided by the user and processes them. In some embodiments, all credentials may be collected before they are processed. In other embodiments, step 302 is inside loop 306; i.e., credentials are processed as the user supplies them. In still other embodiments, credentials are collected and processed in groups (e.g., all wage credentials are collected and processed, then all non-wage income credentials are collected and processed, and so on). Processing for a credential begins at a step 308. There, a corresponding provider for each credential is identified. For example, a wage statement may include an employer identification number, which can be used to determine the appropriate payroll provider. In other cases, the user identifies the provider when the credential is received. In still other embodiments, the credential itself indicates the appropriate provider.

Once the corresponding provider is identified, processing continues at step 310 where the credential is transmitted to the provider. In some cases, a dedicated connection between the system and the provider is used for this communication. This may be necessary if, for example, the user must normally use two-factor authentication to access the provider. In other cases, the provider system used for importing tax data is distinct from the provider system normally accessed by the user but uses the same credentials even though it is not publically accessible. In still other cases, the communication occurs via the same interface normally used by the user to access the provider system. In yet other cases, no user access is available at all and access is only available by prior arrangement with the provider.

Next, at decision 312, it is determined whether the provider verifies that the credential is valid and whether the information identifying the taxpayer on the form matches the information provided by the user at step 300. In some cases, there may be an explicit acknowledgement that the credential is valid, followed by the system requesting the associated information (e.g., the tax form). In other cases, the associated information is provided directly in response to a valid credential, while an error message is provided in response to an invalid credential. Once the associated information has been received, it is determined whether it corresponds to the taxpayer for whom the return is being prepared. As discussed elsewhere, this can be direct (by matching a name, address, and/or taxpayer identification number included in the information against the taxpayer's information) or indirect (by matching account or transaction information with similar information already linked to the taxpayer). If so, processing proceeds to a step 314, where the information is imported into the tax preparation engine. If appropriate, this process may be repeated for multiple tax forms associated with the credential.

Once the tax information has been imported, processing continues to step 316 where the authentication metric is adjusted based on the validation of the credential and the information accessible using the credential. In some embodiments, the authentication metric is increased by a fixed amount for each credential validated. In other embodiments, different types of credentials result in different increases in authentication metrics. For example, a wage statement (which could have been stolen from a mailbox) may result in a smaller increase in the authentication metric than a username and password to an online brokerage account. In some embodiments, the credential itself can affect the increase in the authentication metric. For example, a three-digit PIN (which could be guessed) could result in a smaller increase than a strong password. In some embodiments, the provider can impact the size of the increase. For example, a financial institution known to have a more effective fraud prevention department might contribute accordingly more to the increase in the authentication metric. In other embodiments, the account itself can affect the change in the authentication metric, so that an account that has existed for 20 years contributes more to the authentication metric than one that has only existed for 20 days.

Similarly, the information accessible using a valid credential may impact the size of the change in the authentication metric. For example, a credential that allows access to a tax form including the name, address, phone number, and taxpayer identification number provided by the user may contribute more to the authentication metric than a credential that allows access to information only including the name. In some embodiments, a credential that cannot be tied to the taxpayer has no impact on the authentication metric. In this way, a fraudulent user cannot escape authentication by providing a large number of credentials that are not actually affiliated with the taxpayer. In such embodiments, the important source of authentication confidence is the information behind the credentials, rather than the credentials themselves. One of skill in the art will, upon reviewing this disclosure, immediately see that a wide variety of factors can be used to determine the change in the authentication metric resulting from the data accessible using a valid set of credentials, and all such factors are considered to be within the scope of the invention.

If decision 312 determined that the provider did not verify that the credentials are valid, or if the information did not match that of the taxpayer, processing instead proceeds to step 318, where the authentication metric is decreased. In some embodiments, if the credential is invalid, the user is instead given the option to re-enter the credentials one or more times, and the authentication metric is not decreased unless the user is ultimately unable to supply a valid credential that can be linked to the taxpayer. In some embodiments, the authentication metric is not decreased as a result of invalid credentials or accounts that cannot be linked to the taxpayer. In some embodiments, the decrease in the authentication metric is constant for each invalid credential, while in other cases different credentials may result in different decreases, as discussed above. In some cases, different classes of credentials may handle rejection differently. After step 316 or 318 (depending on whether the credential was valid and linked to the taxpayer or not), the iteration of loop 306 for the credential being processed terminates, and processing returns to the beginning of loop 306 to handle another credential.

Once all the credentials have been processed by loop 306, processing proceeds to decision 320 where the authentication metric is compared to an authentication threshold to determine if the user has been opportunistically authenticated. As discussed elsewhere, this threshold may be constant or vary for different authentication purposes. It may be the case that multiple authentications are requested for different purposes during the course of preparing the return, and the threshold may be different for each such authentication. Furthermore, the authentication metric may also change between authentications as a result of processing additional authentication credentials. Thus, a successful check for opportunistic authentication may be followed by a failed one, or vice versa.

If the authentication metric is lower than the required threshold, processing continues at step 322, where a traditional authentication step takes place. In some embodiments, the user is presented with an out-of-wallet question at this step to further authenticate them. As discussed above, these out-of-wallet questions generally relate to information known to the user that would not be readily available to an identity thief. Next, at decision 324, it is determined whether the answer supplied by the user matches the expected answer. If the answer matches, processing continues to step 326, where the authentication metric is accordingly increased by an appropriate amount. In some embodiments, this will be the same amount by which a verified set of credentials increases the authentication metric, while in others it will be different to account for the relative security of the information. Then processing returns to decision 320 to determine whether the revised authentication metric now exceeds the threshold. In this way, the number of (for example) out-of-wallet questions that the user must answer can be made to depend on the authentication metric established using opportunistic authentication. If, on the other hand, decision 324 determined that the answer supplied by the user was incorrect, processing instead moves to decision 328. In some embodiments, a failure of the traditional authentication step decreases the authentication metric as well.

At decision 328, it is determined whether a maximum number of failures has been exceeded. In some embodiments, this may instead be replaced by whether a check of whether the authentication metric has fallen below a cutoff threshold. In either case, with sufficient failures, processing moves to step 330, where authentication is declined. The effect of this will vary depending on the purposes for which authentication was requested. For example, it may mean that the user cannot electronically file the return, and instead must file traditionally. In another embodiment, it may mean that the user cannot use the system at all. If the authentication was requested for payment purposes, then payment may be declined. At this point, the method terminates. If, on the other hand, decision 328 determined that the maximum number of failures has not yet been exceeded (or that the authentication metric has not fallen below the cutoff), processing returns to step 322 and the user can attempt the traditional authentication step again.

If decision 320 determines that the authentication metric exceeds the threshold, whether as the result of opportunistic authentication or as the result of an additional authentication step, processing proceeds to step 332, where the user is authenticated as the taxpayer and whatever operation resulted in requesting the authentication can proceed. For example, if the authentication was requested for electronic filing, the system can submit the return for electronic filing. In some embodiments, such a submission may result in a request for further authentication from the government tax authority, such as a request for the user to provide an electronic filing PIN. In other embodiments, the accumulated evidence of authenticity may be sufficient. In other cases, such as where the authentication was requested for a payment, no further processing may be required and payment can proceed.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for opportunistically authenticating a taxpayer, comprising one or more non-transitory computer-readable media storing computer-executable code that, when executed by at least one computer processor, for providing:
    a user interface engine, generated by the at least one computer processor, presenting one or more user input fields receiving, from a user, information identifying the taxpayer and a plurality of authentication credentials and provide the information and the plurality of authentication credentials to a tax form import engine;
    the tax form import engine, operable, by the at least one computer processor, to transmit each credential of the plurality of the authentication credentials to a respective tax form provider and, if the respective tax form provider verifies that the credential is valid, receive tax-related information therefrom,
    wherein the tax-related information is from a single tax form provider and comprises a plurality of tax-related forms,
    wherein the tax-related information is retrieved by accessing a single tax form provider computer; and
    an authentication engine operable, by the at least one computer processor, to establish an authentication metric, adjust the authentication metric based on whether the tax-related information corresponds to the information identifying the taxpayer, if a final value for the authentication metric is above an authentication threshold, authenticate the user without requiring the user to complete a separate authentication step, if the authentication metric is below the authentication threshold, require the user to complete a separate authentication step, and if the final value for the authentication metric is below the authentication threshold, require the user to complete a separate authentication step,
    wherein the separate authentication step is compared, by the at least one computer processor, to a separate threshold that is different from the authentication threshold,
    wherein the separate threshold requires at least two forms of authentication,
    wherein, the plurality of tax-related forms only qualifies as a single form of authentication,
    wherein at least one second form of authentication is required from a second authentication form provider computer to meet the separate threshold, and
    wherein the authentication engine communicates, by the at least one computer processor, with a government tax authority computer to determine that the user is separately authenticated by a government tax authority;

wherein the authentication metric is further adjusted, by the at least one computer processor, based on a result of the authorization by the government tax authority;

wherein the authentication engine is further operable to, based on the final value of the authentication metric, present the user with one or more out-of-wallet questions before authenticating the user;

wherein the one or more out-of-wallet questions is presented by a display to the user after determining that the final value of the authentication metric is not sufficient to authenticate the user without further user interaction, wherein a response is received, by the at least one computer processor from the user, corresponding to the one or more out-of-wallet question; and wherein the user is authenticated, by the at least one computer processor, based at least on the response, wherein the steps of presenting, by the display and to the user, the one or more out-of-wallet question and receiving, by the at least one computer processor, a response from the user a number of times are repeated, and wherein the number of times depends on the final value of the authentication metric.

2. The system of claim 1, wherein the plurality of authentication credentials comprises a credential useable to import a wage statement.

3. The system of claim 1, wherein the plurality of authentication credentials comprises a credential useable to import a non-wage income statement.

4. The system of claim 1, wherein the authentication metric is established at least in part based on the user's history of tax filing.

5. The system of claim 1, wherein the authentication metric is further adjusted based on a payment account supplied by the user for purposes selected from the set consisting of: paying an amount due to the government tax authority, paying an amount due for tax preparation, and receiving a refund due from the government tax authority.

6. The system of claim 5, wherein an amount associated with the further adjustment is based at least in part on an age associated with the payment account.

7. The system of claim 1, wherein the plurality of authentication credentials comprises a credential useable to import data from a financial management services provider.

8. A computerized method, operable by at least one computer processor, for opportunistically authenticating a taxpayer, comprising the steps of:

receiving, by the at least one computer processor, from a user, information identifying a taxpayer receiving, by the at least one computer processor, from the user, a plurality of authentication credentials useable to import a plurality of tax forms from a plurality of tax form providers and, if the respective tax form provider verifies that the plurality of authentication credentials are valid, receive tax-related information therefrom, wherein the tax-related information is retrieved by accessing a plurality of computers of the respective plurality of tax form providers;

establishing, by the at least one computer processor, an authentication metric;

for each credential of the plurality of authentication credentials, submitting, by the at least one computer processor, the credential to a respective tax form provider of the plurality of tax form providers;

importing, by the at least one computer processor, a corresponding tax form and increasing a value of the authentication metric if the tax form includes information corresponding to the information identifying the taxpayer;

after importing each of the plurality of tax forms, determining, by the at least one computer processor, whether a final value of the authentication metric is sufficient to authenticate the user without requiring further user interaction, require the user to complete a separate authentication step to meet an authentication threshold, wherein the authentication threshold requires at least two forms of authentication;

wherein the plurality of tax forms only qualify as a single form of authentication, requiring at least one second form of authentication from a second authentication form provider computer to meet a separate threshold;

communicating, by the at least one computer processor, with a government tax authority computer to determine that the user is separately authenticated by a government tax authority;

adjusting the authentication metric based on the result of the authorization by the government tax authority; and presenting the user with one or more out-of-wallet questions before authenticating the user based on the final value of the authentication metric;

after determining that the final value of the authentication metric is not sufficient to authenticate the user without further user interaction, presenting, by a display and to the user, the one or more out-of-wallet question;

receiving, by the at least one computer processor, a response from the user corresponding to the one or more out-of-wallet question; and based at least on the response, authenticating the user by the at least one computer processor; and repeating the steps of presenting, by the display and to the user, the one or more out-of-wallet question and receiving, by the at least one computer processor, a response from the user a number of times, wherein the number depends on the final value of the authentication metric.

9. The method of claim 8, wherein the plurality of authentication credentials includes a first credential useable to import a wage statement and a second credential useable to import a non-wage income statement.

10. The method of claim 8, wherein the plurality of authentication credentials further includes a credential useable to electronically submit a completed tax return.

11. The method of claim 8, wherein the step of increasing an authentication credential of the plurality of authentication credentials further comprises increasing the authentication credential by an amount depending on the respective tax form provider.

12. One or more non-transitory computer-readable media storing computer-executable instructions that, when executed by at least one processing element, perform a method of opportunistically authenticating a user, comprising the steps of:

receiving, by the at least one processing element, information identifying a taxpayer;

receiving, by the at least one processing element, a first credential useable to import a non-wage income statement;

receiving, by the at least one processing element, a second credential useable to import a wage statement;

transmitting, by the at least one processing element, the first credential to a first financial institution;

receiving, by the at least one processing element, from the first financial institution, a plurality of non-wage income statements;

transmitting, by the at least one processing element, the second credential to a payroll provider;

receiving, by the at least one processing element, from the payroll provider, a wage statement;

determining, by the at least one processing element, based at least in part on information contained in the wage statement and the plurality of non-wage income statements in response to the first and second credentials, that an additional authentication step is necessary to authenticate the user as the taxpayer, determining that an authentication metric is below an authentication threshold, requiring the user to complete a separate authentication step, wherein the authentication threshold requires at least two forms of authentication, determining that the plurality of non-wage income statements are provided from a single institution, determining that the plurality of non-wage income statements only qualifies for a single form of authentication, requiring at least one second form of authentication from a second authentication form provider computer to meet the separate threshold;

communicating with a government tax authority computer to determine that the user is separately authenticated by the government tax authority;

adjusting the authentication metric based on the result of the authorization by the government tax authority; and presenting the user with one or more out-of-wallet questions before authenticating the user based on the final value of the authentication metric.

13. The media of claim 12, wherein the method further comprises the steps of receiving a third credential useable to import a non-wage income statement;

transmitting the third credential to a second financial institution; and receiving, from the second financial institution, an additional non-wage income statement; and wherein the step of determining whether the additional authentication step is necessary to authenticate the user as the taxpayer is further based on information contained in the second non-wage statement.

14. The media of claim 12, wherein the method further comprises the steps of:

submitting a completed tax return incorporating information from the wage statement and the plurality of non-wage income statement to a government tax authority; and wherein the step of determining whether an additional authentication step is necessary to authenticate the user as the taxpayer is further based on a response by the government tax authority to the step of submitting.

15. The media of claim 12, wherein the method further comprises the steps of receiving a third credential useable to import information from a financial management services provider;

transmitting the third credential to the financial management services provider; and receiving tax-related information from the financial management services provider in response; and wherein the step of determining whether an additional authentication step is necessary to authenticate the user as the taxpayer is further based on a portion of the tax-related information from the financial management services provider in response to transmitting the third credential.

16. The media of claim 12, wherein the method further comprises the step of:

in response to determining whether an additional authentication step is necessary to authenticate the user as the taxpayer, presenting the user with the one or more out-of-wallet questions.

17. The method of claim 8, wherein the authentication metric is further adjusted based on a payment account supplied by the user for purposes selected from the set consisting of: paying an amount due to a government taxing authority, paying an amount due for tax preparation, and receiving a refund due from a government taxing authority.

18. The method of claim 12, wherein the authentication metric is further adjusted based on a payment account supplied by the user for purposes selected from the set consisting of: paying an amount due to a government taxing authority, paying an amount due for tax preparation, and receiving a refund due from a government taxing authority.

* * * * *